United States Patent
Kalevo

(10) Patent No.: US 7,821,548 B2
(45) Date of Patent: Oct. 26, 2010

(54) TEMPORAL IMAGE BUFFER FOR IMAGE PROCESSOR USING COMPRESSED RAW IMAGE

(75) Inventor: Ossi Kalevo, Toijala (FI)

(73) Assignee: Nokia Corporation, Espoo (FI)

( * ) Notice: Subject to any disclaimer, the term of this patent is extended or adjusted under 35 U.S.C. 154(b) by 1349 days.

(21) Appl. No.: 11/145,430

(22) Filed: Jun. 3, 2005

(65) Prior Publication Data

US 2006/0274190 A1 Dec. 7, 2006

(51) Int. Cl.
*H04N 5/76* (2006.01)
(52) U.S. Cl. .................................. 348/231.1
(58) Field of Classification Search .............. 348/222.1, 348/231.1, 231.2, 239
See application file for complete search history.

(56) References Cited

U.S. PATENT DOCUMENTS

| | | | |
|---|---|---|---|
| 5,016,107 A | 5/1991 | Sasson et al. | |
| 6,215,523 B1 | 4/2001 | Anderson | |
| 6,710,950 B2 | 3/2004 | Rouvinen et al. | |
| 6,857,043 B1 * | 2/2005 | Lee et al. | 711/109 |
| 7,436,554 B2 * | 10/2008 | Nitta et al. | 358/474 |
| 2001/0013896 A1 | 8/2001 | Anderson | |
| 2002/0015447 A1 | 2/2002 | Zhou | |
| 2003/0117505 A1 | 6/2003 | Sasaki et al. | |
| 2003/0177295 A1 * | 9/2003 | Hsu et al. | 710/200 |
| 2004/0027461 A1 | 2/2004 | Boyd | |
| 2004/0202375 A1 | 10/2004 | Kalevo | |

FOREIGN PATENT DOCUMENTS

| | | |
|---|---|---|
| CN | 2146738 | 11/1993 |
| EP | 1 667 457 | 6/2006 |
| WO | WO 2004/064402 | 7/2004 |
| WO | WO 2004064402 A1 * | 7/2004 |

OTHER PUBLICATIONS

How Digital Camera Work, http://teacherweb.newmanschool.org, Apr. 25, 2005, 1 pg.
International Search Report for Application PCT/IB2006/001451.
Extended European Search Report for European Application No. 06744809 dated Nov. 24, 2009.
Supplementary European Search Report for European Application No. 06744809 dated Nov. 13, 2009.

* cited by examiner

Primary Examiner—David L Ometz
Assistant Examiner—Dillon Durnford-Geszvain
(74) Attorney, Agent, or Firm—Harrington & Smith

(57) ABSTRACT

A system and method for capturing and storing digital images. Instead of processing images on the fly or storing images in a raw format, the present invention involves the compression of captured images before the images are stored. When it is desirable to display an image, the particular image can be decoded and processed as necessary. The present invention reduces the amount of storage space necessary for each image. A variety of compression algorithms and systems can be used in conjunction with the present invention.

20 Claims, 4 Drawing Sheets

US 7,821,548 B2

TEMPORAL IMAGE BUFFER FOR IMAGE PROCESSOR USING COMPRESSED RAW IMAGE

FIELD OF THE INVENTION

The present invention relates generally to image processing architectures. More particularly, the present invention relates to the processing and storage of digital images in digital cameras and other electronic devices.

BACKGROUND OF THE INVENTION

Camera sensors capture light through the use of optics and convert photons into digital numbers. The captured image is usually in a raw Bayer format. The captured image is processed and is often stored in the memory of the camera or another device. The captured image is often stored using compression methods such as Joint Photographic Experts Group (JPEG) or Moving Picture Experts Group (MPEG) algorithms. The captured raw image can also be processed directly to a display on the capturing device or another device in communication with the capturing device. Additionally, a "digital zoom" feature can also be used when images are captured and stored, or after the images are stored.

When raw images are captured to a device memory, a significant amount of memory space is required to store them in a raw format. An alternative to storing such a large file in the memory unit is processing the image "on the fly," but this requires significant processing power on the part of the electronic device at issue. On the fly processing also reduces the overall processing flexibility for the image. For example, automatic white balancing (AWB) must be performed based upon the previous frame's statistical information during AWB processing. When the images are captured with a serial shooting mode (where the images are continuously captured or captured in a rapid series), the required buffer size for uncompressed raw images will rapidly become very large and/or the number of captured images will be highly restricted.

SUMMARY OF THE INVENTION

The present invention involves storing raw images in a compressed format on the memory unit of an electronic device instead of storing the raw images to the memory buffer. The present invention utilizes a compression method that is simple in terms of both encoding and decoding and does not result in visible coding artifacts. Using a compression format can also be very beneficial in instances where the image lines of an image can be separately decoded so that the image processing is easy to initiate from any image position without requiring extra decoding and the associated additional overhead.

With the system and method of the present invention, the amount of memory space needed for temporal raw image storage is greatly reduced relative to conventional systems. Additionally, image processing with the present invention can utilize current frame statistics in AWB.

These and other objects, advantages and features of the invention, together with the organization and manner of operation thereof, will become apparent from the following detailed description when taken in conjunction with the accompanying drawings, wherein like elements have like numerals throughout the several drawings described below.

DETAILED DESCRIPTION OF THE PREFERRED EMBODIMENTS

Figure 1:
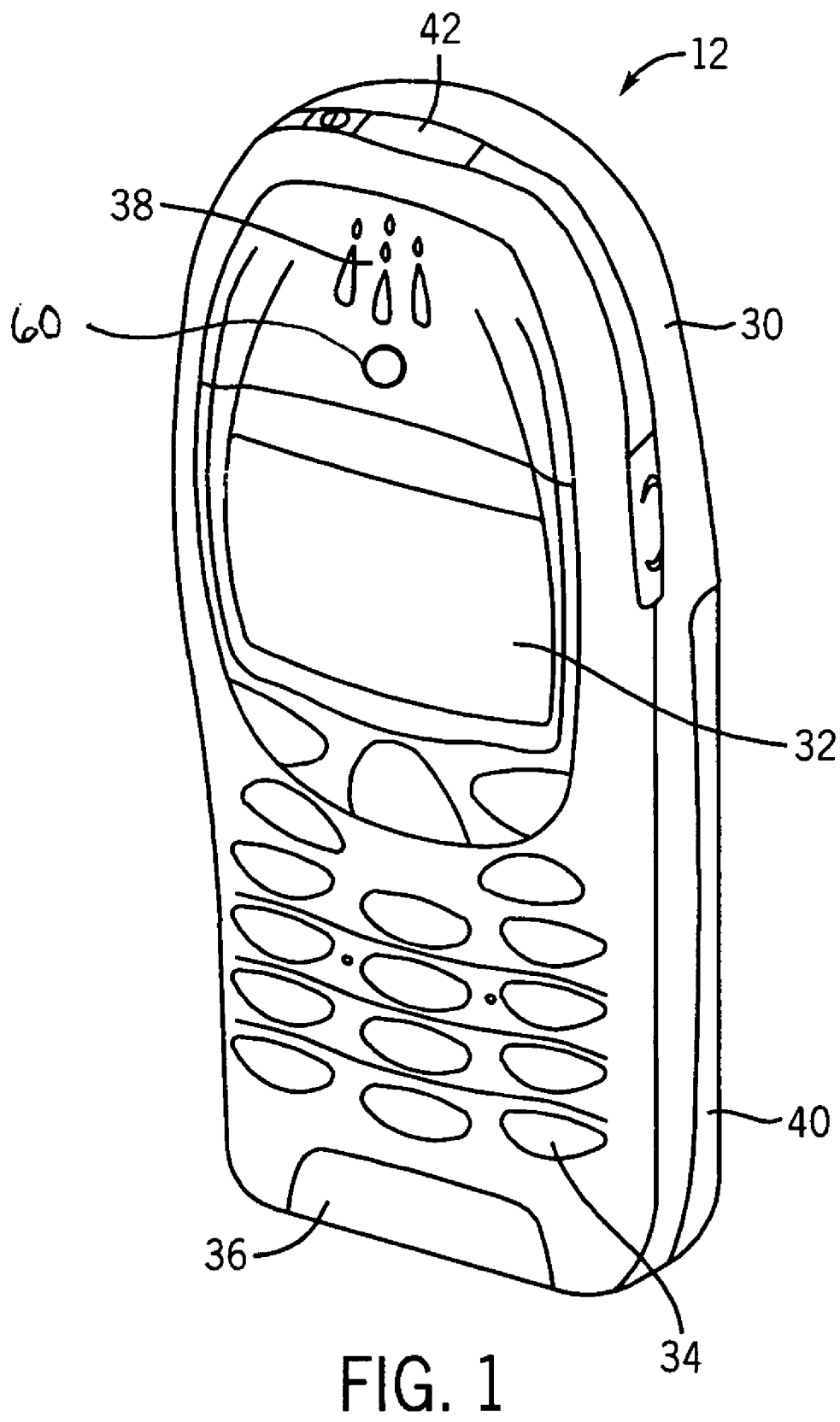
FIG. 1 is a perspective view of a mobile telephone that can be used in the implementation of the present invention.
Figure 2:
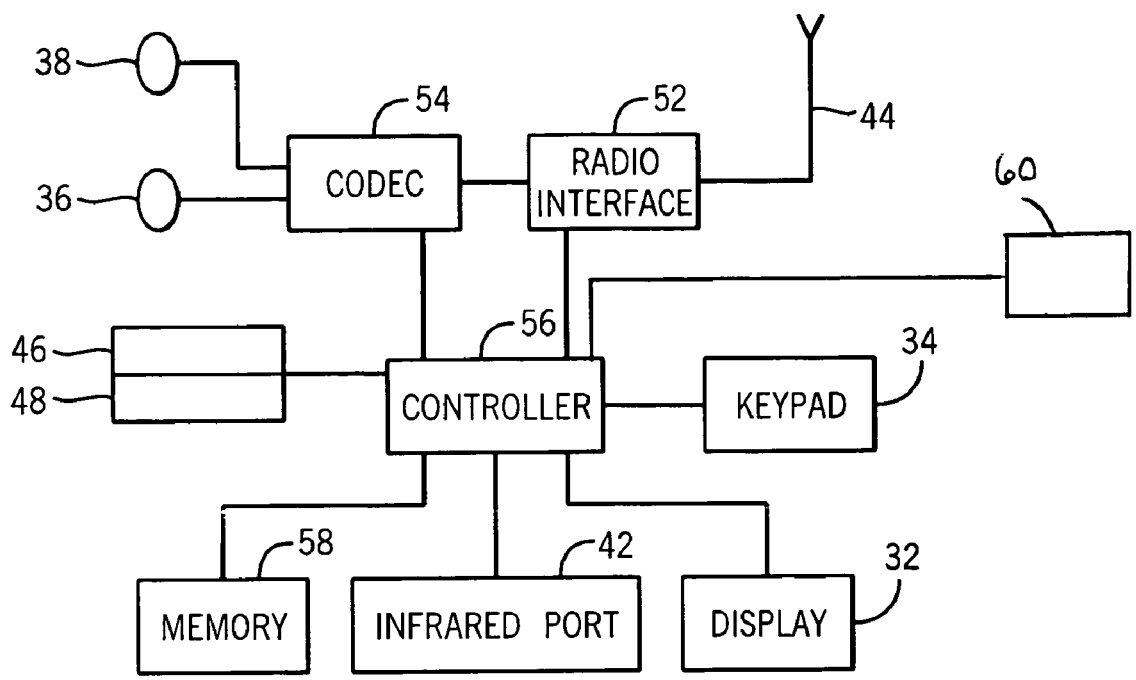
FIG. 2 is a schematic representation of the telephone circuitry of the mobile telephone of FIG. 1.

FIGS. 1 and 2 show one representative mobile telephone 12 within which the present invention may be implemented. It should be understood, however, that the present invention is not intended to be limited to one particular type of mobile telephone 12 or other electronic device. In fact, the present invention can be incorporated into virtually any type of electronic device. The mobile telephone 12 of FIGS. 1 and 2 includes a housing 30, a display 32 (in the form of a liquid crystal display, for example), a keypad 34, a microphone 36, an ear-piece 38, a battery 40, an infrared port 42, an antenna 44, a smart card 46 in the form of a UICC according to one embodiment of the invention, a card reader 48, radio interface circuitry 52, codec circuitry 54, a controller 56 and a memory 58. The mobile telephone 12 also includes a camera system 60 operatively connected to the controller 56. Individual circuits and elements are all of a type well known in the art, for example in the Nokia range of mobile telephones.

Figure 3:
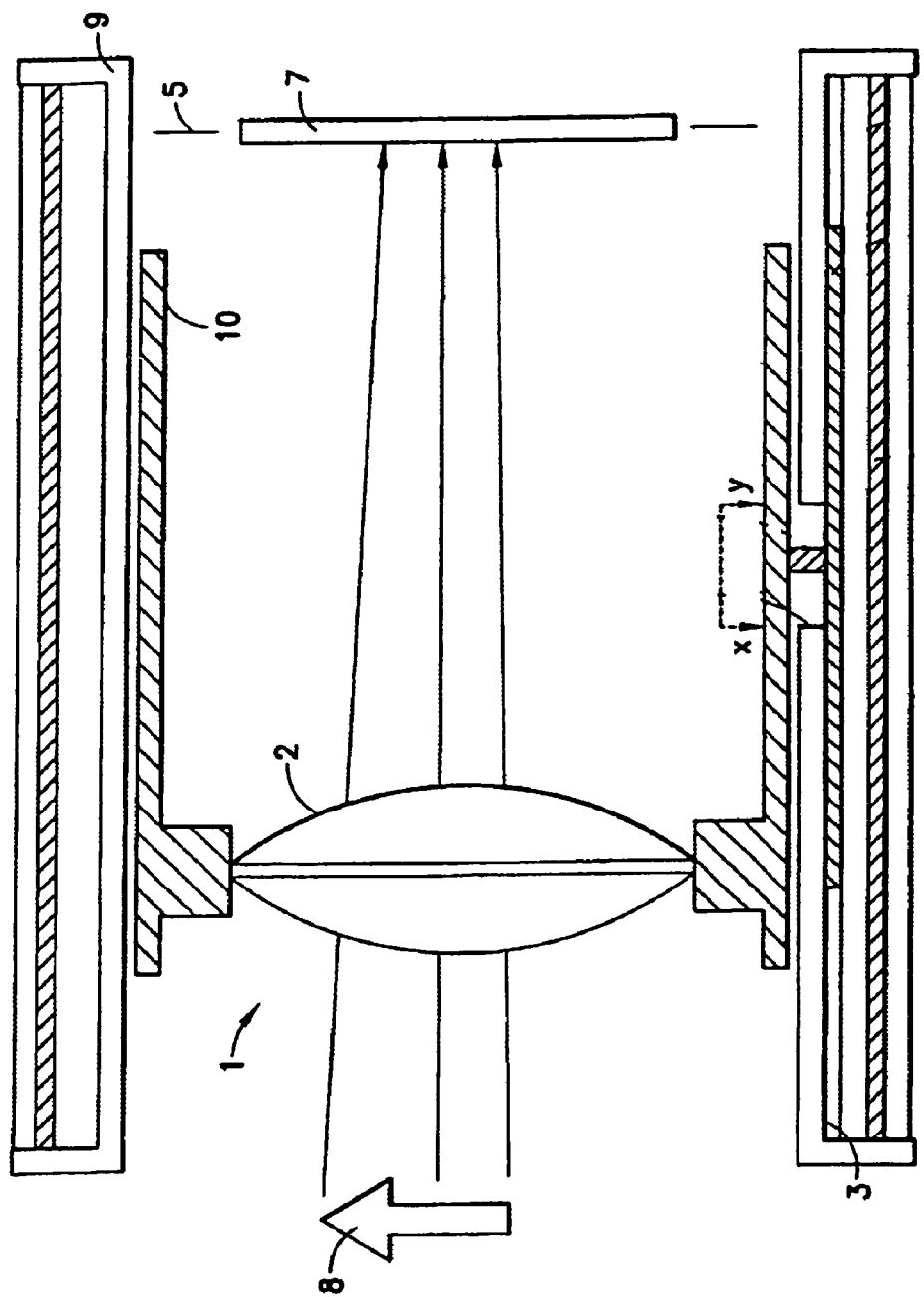
FIG. 3 is a schematic view of a simple optical system for use in a digital camera.

A typical optical lens system 1 for a camera system 60 is depicted schematically in FIG. 3. The lens system 1 shown in FIG. 3 includes a primary lens 2 which operates to project a focused image of an object 8 onto an image plane 5. The primary lens 2 is adjustable over the x-y range. The lens system 1 is secured within a housing (not shown) to project an image of the object 8 onto an image sensor 7 that is positioned at the image plane 5. The lens system 1 also includes a support tube 9 and a lens tube 10. The lens tube 10 holds the primary lens 2 and is mounted coaxially within the support tube 9.

Figure 4:
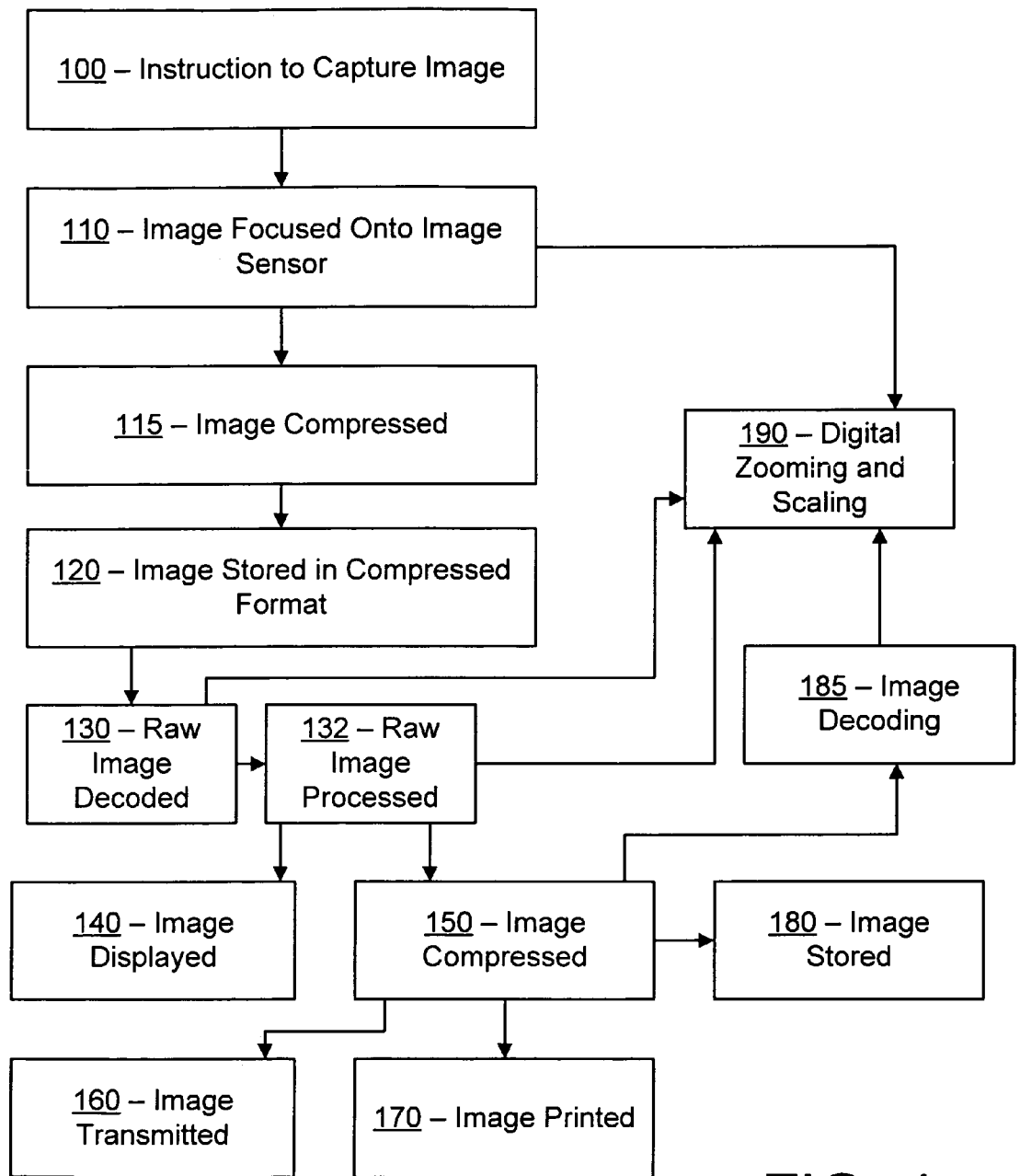
FIG. 4 is a flow chart showing the implementation of one embodiment of the present invention.

FIG. 4 is a flow chart showing the implementation of one embodiment of the present invention. At step 100 in FIG. 4, a user instructs his or her electronic device to capture an image of the object 8. As discussed previously, the electronic device can take a wide variety of forms, ranging from a stand-alone digital camera to a mobile telephone with digital camera capabilities to a digital camera incorporated into a laptop or desktop computer, personal digital assistant (PDA) or other devices. At step 110, an image of the object 8 is focused onto the image sensor 7. The image sensor 7 can comprise a charge coupled device (CCD), which includes a plurality of transistors. The image sensor 7 can also comprise a complementary metal oxide silicon (CMOS) sensor. The projection of the image 8 onto each of the plurality of transistors creates electrical currents in proportion to the intensity of the light striking each transistor. The electrical currents pass through an analog-to-digital converter to translate the varying signals into a digital format.

At step 115, and instead of storing raw images to the memory buffer of the respective electronic device, the image is compressed and, at step 120, stored within the memory unit 58 in a compressed format according to the present invention. The present invention involves the use of a compression method that is simple in terms of both encoding and deciding and does not cause visible coding artifacts. The present invention also provides a substantial benefit if the individual image lines in the respective image can be separately decoded, in which case the processing of the image is easy to begin from any image position without a large overhead or extra decoding.

A variety of coding methods can be used in conjunction with the present invention. One such coding method comprises a DPCM/PCM codec described in PCT International Publication No. WO 2004/064402 in the name of Nokia Corporation and incorporated herein by reference. This particular coding method is particularly suitable with the present invention because the size of the compressed image is always known and this coding method is also used in Standard Mobile Imager Architecture (SMIA) profiles 1 and 2. The SMIA standard is an open standard for use by all companies making, buying or specifying miniature integrated camera modules for use in mobile applications. All SMIA camera modules with profiles 1 or 2 can encode images according to this method and no additional hardware is need for encoding purposes. It should also be noted that the encoding can be performed in the receiver module before the image is stored to the memory buffer.

At some point in time after the image has been compressed, the image is then decoded from the memory buffer at step 130 and is processed at step 132. The image can then be displayed at step 140. After image processing, the image can also be compressed at step 150 and transmitted to a remote device (step 160), printed (step 170) or stored (step 180) using, for example, JPEG or MPEG formats.

SMIA-compatible sensors are capable of performing DPCM/PCM encoding. When such sensors are used, there is no need for additional hardware for the processor chip or between the image sensor 7 and the associated software. In many instances, it is beneficial for the processor chip to be capable of performing the image encoding and decoding the image with hardware so that there are no additional MIPS requirements with the system. In addition, when a hardware encoder is included in the processor, then virtually any camera module with raw image output capabilities can be used in conjunction with the present invention.

The present invention can also be used in conjunction with digital zooming functions. With the present invention, there are no restrictions for cropping or scaling an individual image. Scaling can be performed, for example, using an image scalar of the type described in the SMIA functional specification. A raw image can be compressed in a similar way with the DPCM/PCM codec when the raw image is in a Bayer or co-sited scaled image format. Digital zooming (cropping) and scaling, represented at step 190 in FIG. 4, can be performed before the raw image is compressed, after storing but before processing, after processing but before image compression, or after image compression, although cropping and scaling cannot be performed when the image is in compressed form. If the image has been compressed, then it must be decoded, as represented at steps 132 and 185, before the zooming or scaling occurs.

A variety of different raw image formats can be used with the present invention. However, there must be a fixed order of color pixels so that the DPCM/PCM codec properly operates.

In one embodiment of the invention, DPCM/PCM compression is used so that each compressed byte (which comprises 8 bits) contains one raw image pixel, for example using 10−>8 or 12−>8 compression. If, on the other hand, compression efficiency is more important, then other compression ratios, such as 10−>6 or 10−>7 compression ratios, may be used.

For the present invention, there is a minimum memory requirement that at least one compressed image frame buffer be available in the memory unit that can be used by the image processor. In one embodiment of the invention, the memory unit includes sufficient space for multiple image buffers. In such a situation, a subsequent image can always be captured in the next image buffer. When the last image buffer has been used, then the next image can be stored in the first image buffer and the process repeated. In one particular embodiment of the invention, three different indexes are used. The first index shows the image buffer number for the next capture. The second index indicates the image buffer number for the first unprocessed or unsaved image buffer. The third index indicates the number of available image buffers. By using these indexes, the captured image is never overwritten, as the device is not permitted to capture new images when the first two indexes are pointing to the same buffer.

The third index is required because of the possibility that the memory configuration can be changed. Stored images can always be moved to another memory unit or to another area in the same memory for either temporary or permanent storage. In the case of permanent storage, the images can be stored using any acceptable compression format, such as JPEG, MPEG or DPCM/PCM. It should also be noted that the images can be saved to a permanent storage in a compressed raw image format if so desired. Additionally, it should be noted that it is not always necessary to process individual images before they are displayed, printed or transmitted; they can be maintained in a compressed format until an action is requested that requires processing. This permits a maximum amount of information to be saved in a compressed, compact format for an extended period of time.

The present invention is described in the general context of method steps, which may be implemented in one embodiment by a program product including computer-executable instructions, such as program code, executed by computers in networked environments.

Generally, program modules include routines, programs, objects, components, data structures, etc. that perform particular tasks or implement particular abstract data types. Computer-executable instructions, associated data structures, and program modules represent examples of program code for executing steps of the methods disclosed herein. The particular sequence of such executable instructions or associated data structures represents examples of corresponding acts for implementing the functions described in such steps.

Software and web implementations of the present invention could be accomplished with standard programming techniques with rule-based logic and other logic to accomplish the various database searching steps, correlation steps, comparison steps and decision steps. It should also be noted that the words "component" and "module" as used herein, and in the claims, is intended to encompass implementations using one or more lines of software code, and/or hardware implementations, and/or equipment for receiving manual inputs.

The foregoing description of embodiments of the present invention have been presented for purposes of illustration and description. It is not intended to be exhaustive or to limit the present invention to the precise form disclosed, and modifications and variations are possible in light of the above teachings or may be acquired from practice of the present invention. The embodiments were chosen and described in order to explain the principles of the present invention and its practical application to enable one skilled in the art to utilize the present invention in various embodiments and with various modifications as are suited to the particular use contemplated.

What is claimed is:

1. A method for capturing a digital image, comprising:
   upon the initiation of an instruction to capture an image, focusing the image onto an image sensor to form a raw digital image;
   compressing the raw digital image; and
   storing the raw digital image in a compressed format in a memory unit, wherein the memory unit includes:
      a first index for indicating an image buffer to be used for a next image to be captured; and
      a second index for indicating an image buffer for a first unprocessed or unsaved buffer image; and
      a third index for indicating a number of available image buffers.

2. The method of claim 1, further comprising, after storing the raw digital image in a compressed format, decoding and processing the raw digital image.

3. The method of claim 2, further comprising, after decoding and processing the raw digital image, displaying the image.

4. The method of claim 2, further comprising, after decoding and processing the raw digital image:
   compressing the processed digital image; and
   performing an action selected from the group consisting of printing the processed digital image, storing the processed digital image, and transmitting the processed digital image to a remote location.

5. The method of claim 2, further comprising, after decoding and processing the raw digital image, scaling or cropping the processed digital image.

6. The method of claim 1, wherein the compressing of the raw digital image comprises Differential Pulse Code Modulation (DPCM)/Pulse Code Modulation (PCM) compression.

7. The method of claim 1, wherein the raw digital image is stored in an image buffer within the memory unit.

8. A computer program product, embodied on a computer readable medium, for capturing a digital image, comprising:
   computer code for, upon the initiation of an instruction to capture an image, focusing the image onto an image sensor to form a raw digital image;
   computer code for compressing the raw digital image; and
   computer code for storing the raw digital image in a compressed format in a memory unit, wherein the memory unit includes:
      a first index for indicating an image buffer to be used for a next image to be captured; and
      a second index for indicating an image buffer for a first unprocessed or unsaved buffer image; and
      a third index for indicating a number of available image buffers.

9. The computer program product of claim 8, further comprising computer code for, after storing the raw digital image in a compressed format, decoding and processing the raw digital image.

10. The computer program product of claim 9, further comprising computer code for, after decoding and processing the raw digital image, displaying the image.

11. The computer program product of claim 9, further comprising computer code for, after decoding and processing the raw digital image:
   compressing the processed digital image; and
   performing an action selected from the group consisting of printing the processed digital image, storing the processed digital image, and transmitting the processed digital image to a remote location.

12. The computer program product of claim 9, further comprising computer code for, after decoding and processing the raw digital image, scaling or cropping the processed digital image.

13. An electronic device, comprising:
   a processor;
   a camera system operatively connected to the processor and including an image sensor; and
   a memory unit operatively connected to the processor and including:
      computer code for, upon the initiation of an instruction to capture an image, focusing the image onto the image sensor to form a raw digital image;
      computer code for compressing the raw digital image; and
      computer code for storing the raw digital image in a compressed format, wherein the memory unit includes:
         a first index for indicating an image buffer to be used for a next image to be captured; and
         a second index for indicating an image buffer for a first unprocessed or unsaved buffer image; and
         a third index for indicating a number of available image buffers.

14. The electronic device of claim 13, wherein the memory unit further includes computer code for, after storing the raw digital image in a compressed format, decoding and processing the raw digital image.

15. The electronic device of claim 14, wherein the memory unit further includes computer code for, after decoding and processing the raw digital image, displaying the image.

16. The electronic device of claim 14, wherein the memory unit further includes computer code for, after decoding and processing the raw digital image:
   compressing the processed digital image; and
   performing an action selected from the group consisting of printing the processed digital image, storing the processed digital image, and transmitting the processed digital image to a remote location.

17. The electronic device of claim 14, wherein the memory unit further includes computer code for, after decoding and processing the raw digital image, scaling or cropping the processed digital image.

18. The electronic device of claim 13, wherein the compressing of the raw digital image comprises Differential Pulse Code Modulation (DPCM)/Pulse Code Modulation (PCM) compression.

19. The electronic device of claim 13, wherein the memory unit includes a plurality of sequential image buffers, and wherein the raw digital image is stored in the first available image buffer.

20. The electronic device of claim 19, wherein the digital image is not permitted to be stored if the first index and the second index indicate the same image buffer.

* * * * *